Feb. 8, 1944.  S. D. BRADLEY  2,340,926
PLASTIC CONDUIT
Filed Sept. 5, 1940
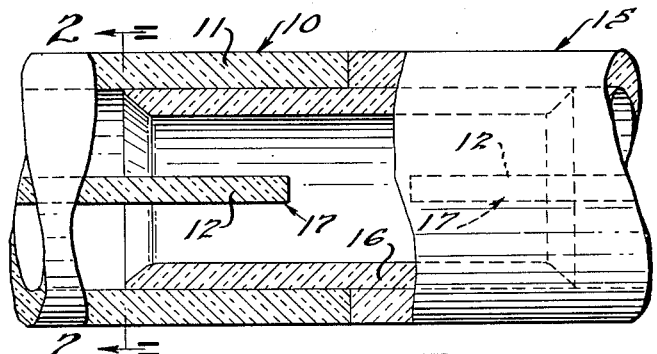
FIG. 1.
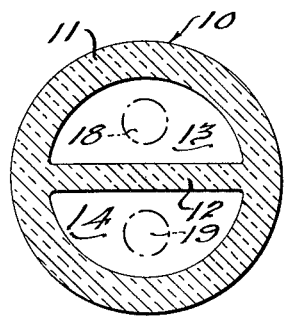
FIG. 2.
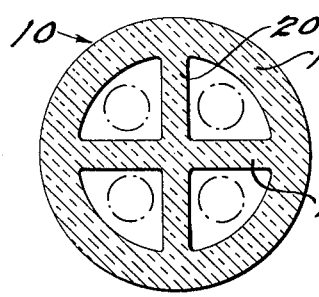
FIG. 3.
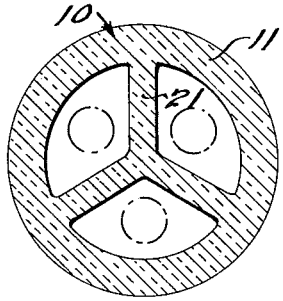
FIG. 4.
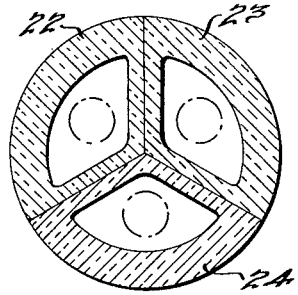
FIG. 5.
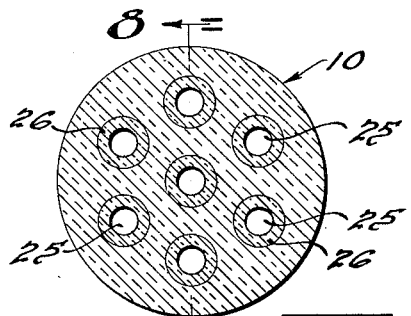
FIG. 6.
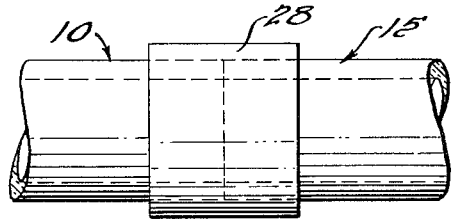
FIG. 7.
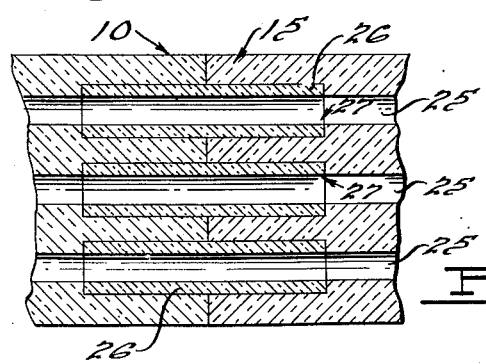
INVENTOR
Stephen Duncan Bradley
BY Dike, Calver & Gray
ATTORNEYS.

Patented Feb. 8, 1944

2,340,926

UNITED STATES PATENT OFFICE 2,340,926

PLASTIC CONDUIT

Stephen Duncan Bradley, Grosse Pointe Park, Mich., assignor to Detroit Macoid Corporation, Detroit, Mich., a corporation of Michigan Application September 5, 1940, Serial No. 355,426

2 Claims. (Cl. 138—77)

The present invention relates to plastic conduits and to connectors for joining together parts or sections thereof to form a continuous conduit. The invention is particularly, although not exclusively, useful in connection with insulating and protecting electrical conductors, especially those utilized for wiring structures, such as houses, factories or electrically-operated apparatus. For example, such conduits and the conductors contained therein may be employed for effectively and safely connecting with a source of electric current electrically-operated devices, or for interconnecting various parts of electrically-operated installations, such for instance as interconnecting lighting fixtures, interconnecting a switch and a motor, and the like.

Among the important objects of the invention are the following:

First, the provision of a seamless length or section of plastic conduit having internal compartments or passages, each of which is suited to receive an electrical conductor, said conduit section being of an improved design and formed of an improved material so that it provides a strong substantially impervious dielectric casing for the conductors, thereby fully protecting and insulating the same.

Second, the provision of an improved connector for joining together the aforementioned conduit sections, in particular, the provision of a strong, dielectric extruded plastic connector designed to internally connect said sections in successive abutting relation, thereby providing a neat appearing continuous conduit having smooth, separated conductor receiving compartments or passages preventing the danger of short circuits between the conductors in the conduit.

Third, due to the insulating characteristics of all parts of a conduit embodying the present invention, bare wire may be used therein, rendering unnecessary the use of separate insulating wrappings or coatings on the electrical conductors in said conduit. This procedure not only is much less expensive than the use of non-insulating conduits, such as metal pipe or sheaths, "BX" cable, armored cable, and the like, all of which require the use of insulation-covered wire, but also eliminates the necessity for protective inner packings, wrappings or bushings formerly placed inside of non-insulating conduits to protect the insulation coated conductors from being cut, worn or injured.

Fourth, the conduits of the present invention are safer than those formerly employed since, despite the aforementioned attempts to protect the separately insulated conductors placed in former metallic conduits, the internal insulation or packings were subject to wear and injury, thus leading to short circuits and creating a dangerous fire hazard as well as creating a danger of power failure. Also, the present plastic conduits are safer than former non-metallic conduits because of their improved design and construction. In this regard, the present invention provides for internal dielectric plastic walls or dividing portions within the interior space of the conduit dividing that space into separated conductor receiving compartments or passages and which strengthen the conduit. Thus, conduits embodying the present invention are less likely to break or to wear excessively and, due to the smooth seamless character of their interior, they do not damage or subject the conductor to wear, thus providing for an improved safer wiring system which requires less inspection and repair, and which possesses a longer service life.

Fifth, the present conduits are adapted for rapid mass production and are convenient and easy to install and use in any situation requiring insulated protected electrical wiring.

Other objects and advantages of this invention will appear in the following description and appended claims, reference being had to the accompanying drawing forming a part of this specification wherein like reference characters designate corresponding parts in the several views.

Fig. 1 is an elevation, partially in section, of one embodiment of the present invention and shows portions of two conduit sections joined in abutting relation.

Fig. 2 is a cross sectional view taken substantially along the line 2—2 of Fig. 1 in the direction of the arrows.

Figs. 3 and 4 are cross sectional views of modifications of the embodiment shown in Figs. 1 and 2, in each of which there is shown a different arrangement of the interior partitions forming the conductor receiving compartments or passages.

Figs. 5 and 6 are cross sectional views showing other embodiments of the present invention.

Fig. 7 is an elevation showing portions of two conduit sections joined to form a continuous conduit; but joined in a manner different from that illustrated in Fig. 1.

Fig. 8 is a longitudinal sectional view taken substantially along the line 8—8 of Fig. 6 in the direction of the arrows.

Fig. 9 is an elevation showing, in particular, a protective covering or wrapping useful in connection with the present invention.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

Referring to the embodiment of the invention shown in Figs. 1 and 2, the reference numeral 10 represents, in general, a relatively elongated part or section of a conduit. This section is of a tubular construction and, consequently, possesses an annular body 11. The body 11 is provided with an internal partition or dividing member 12 which separates or divides the interior space therein into a pair of compartments or passages 13 and 14 (Fig. 2). Since the partition 12 extends longitudinally of the conduit section 10, as shown in Fig. 1, the compartments 13 and 14 also extend longitudinally of the conduit. The reference numeral 15 represents a second conduit section which possesses a structure like that of the conduit section 10. As illustrated in Fig. 1, the conduit sections 10 and 15 are joined in successive and abutting relation. It will be readily appreciated that additional conduit sections similar to sections 10 and 15 may be joined to the free ends of the sections 10 and 15 and still other sections joined to such additional sections. By this means a continuous conduit leading from a selected point to another selected point may be built up. The number of sections joined is determined by the length of the conduit desired.

The conduit sections 10 and 15 are maintained in abutting joined relationship by a connector 16. As shown in Fig. 1, the connector 16 is tubular in structure and is dimensioned to fit within the conduit sections 10 and 15. In this regard, the connector 16 is preferably so dimensioned that, when inserted within the conduit sections 10 and 15, it will provide a press fit for holding the conduit sections 10 and 15 together. However, the connector 16 may be positively secured to the walls of the conduit sections 10 and 15 in any suitable manner for so holding the said sections together. It will be noted that the connector 16 is preferably provided with bevelled ends for the purpose of aiding in the insertion of the connector within the conduit sections. Also, the connector 16 is provided with slots, shown at 17 (Fig. 1), which slots are adapted to receive the ends of the partitions 12 in order to permit the insertion of the connector 16 within the conduit sections 10 and 15. In this regard, it will be readily understood that the insertion of the partition 12 within the slots 17 aids in securely holding the connector 16 in assembled relation relative to the joined conduit sections 10 and 15. In assembling the conduit sections, the connector 16 may be inserted in one of the sections, such as the section 10, and the successive section may then be placed over the portion of the connector protruding from the section 10 and then pushed into abutting relation relative thereto. Other assembling procedures are, however, evident.

The conduit sections 10 and 15 and the connector 16 are made from an extruded plastic, that is, they are formed of a plastic which is adapted to be subjected to a shaping or forming operation, and which maintains the form resulting from that operation. For instance, the plastic may be forced through or extruded from a forming die. Thus, the plastic from which the said conduit sections and connectors are made may comprise suitable dielectric material characterized by an ability to be softened to permit extrusion or other shaping operations, which thereafter hardens when cooled to become form sustaining, and which finally sets in the form which it is given. Generally speaking, I have found that many thermo-plastic materials possess the foregoing characteristics and are therefore preferable. For instance, one such material is the plastic material commercially known as "Tenite," the principal ingredient of which is cellulose acetate. Other suitable resins are the polyvinyl compounds, particularly polyvinyl acetate. While, as a rule, thermo-plastics are preferable, the present invention is not limited thereto, since other suitable materials may also be utilized.

In view of the foregoing, it will be understood that a conduit embodying the present invention is formed of a dielectric material and, consequently, possesses good electrical insulating properties. Therefore, the longitudinally extending compartments 12 and 13, within the interior of the conduit, are defined by dielectric walls and are separated from each other by the partition 12 which also is dielectric in character. Therefore, electrical conductors 18 and 19, shown in dotted lines on Fig. 2, may be respectively inserted in each of the compartments 13 and 14 and, when so inserted, will be completely insulated from each other and from contact outside of the conduit. As a result, the electrical conductors 18 and 19 do not need to be provided with a coating of insulating material or an insulating wrapping as is necessary in the usual metallic conductors. Moreover, the conductors 18 and 19 are not only completely insulated by the present conduit but they are thoroughly protected thereby especially since the partition 12 provides a reinforcing means for the conduit body 11 resulting in a strong protective casing surrounding the conductors and separating them from each other.

In each of Figs. 3 and 4 there is shown a modification of the embodiment shown in Figs. 1 and 2, above described. In these modifications the structure of the conduit is not changed except for the provision of a plurality of partitions to form more conductor receiving passages instead of a single partition 12 forming but two such passages. In the modification shown in Fig. 3, in addition to the partition 12, another partition 20 is provided which is generally right angularly disposed with respect to partition 12. As is evident from Fig. 3, this structure divides the interior space within the conduit into quadrants, thereby providing four longitudinally extending conductor receiving compartments or passages, in each of which a conductor may be inserted. In the modification shown in Fig. 4, there is provided, instead of the partition 12, a partition 21 which is generally Y-shaped in cross section. It is, therefore, evident that the partition 21 divides the interior space within the conduit into thirds, thereby providing three compartments, each of which is adapted to receive an electrical conductor. While but three particular arrangements of the partition within the interior of the conduit are expressly illustrated and described herein, it will be readily understood that any suitable arrangement for said partitions can be made in order to divide the space within the conduit into as many conductor receiving passages or compartments as may be desired.

In Fig. 5 there is illustrated another embodiment of the present invention. As there shown, the conduit sections which are secured together to form the continuous conduit, are formed of joined sectors. Each of these sectors is generally pie-shaped to provide an interior passage or compartment. For example, three such sectors, 22, 23 and 24 may be joined together in the manner clearly indicated in Fig. 5 to form the completed conduit section of the present embodiment, the joined walls of the sectors thereby forming an interior partition within the completed conduit section to produce a conduit section similar to that shown in Fig. 4. The sectors 22, 23 and 24 can be joined together by any suitable means, although one satisfactory method of so joining them utilizes a connector similar to the connector 16 but provided with slots positioned to fit over the three branches of the generally Y-shaped partition within the conduit section formed by the joined walls of the sectors. Consequently, this connector serves as a clip for holding the three sectors together to form each conduit section as well as connecting the sections making up the continuous conduit. It will also be appreciated that the sectors 22, 23 and 24 do not have to be dimensioned so that three such sectors are adapted to be joined together to form the completed conduit section. The sectors may be constructed to provide any desired number of compartments within the conduit sections. For example, the modification of the invention shown in Fig. 3 could be so arranged that the partitions 12 and 20 would be divided to provide sectors comprising quadrants of the conduit section, and said quadrants fastened together in the manner explained in connection with the modification shown in Fig. 5.

In Fig. 6 there is illustrated still another embodiment of the present invention. In this embodiment, the conduit section 10 is not provided with an open space within its interior which is divided into compartments. Instead, it is of a solid construction provided with a plurality of longitudinally extending bores or passages 25. Within each one of these bores or passages 25, a conductor may be inserted. As many passages or conductors may be provided as is necessary in any given case. The conduit sections 10 are secured together in the present modification of the invention by means of a plurality of connectors 26 (Fig. 8) each of which is inserted in a suitable counterbore in one of the passages 25, as shown at 27. The counterbores 27 are dimensioned to receive the connectors 26 in such a manner that each of the connectors 26 and its appurtenant bore 25 provide a continuous conductor receiving passage within the conduit when the conduit sections 10 and 15 are joined together in abutting relationship in the manner clearly illustrated in Fig. 8.

In Fig. 7 there is illustrated another method of connecting the conduit sections 10 and 15. According to this method, an external connector 28 is provided to fulfill the function of the internal connectors 16 or 26, explained in connection with the foregoing embodiments of the invention. This external connector 28 fits over the exterior surface of each of the conduit sections 10 and 15 and holds said sections together in abutting relationship. The external connector 28 may be secured to the conduit sections 10 and 15 in any suitable manner although a press fit has been found to be satisfactory. While the connector 28 is preferably formed of a plastic, it may be formed of any suitable material, such as a metal.

In Fig. 9, there is illustrated another feature of the present invention. This feature comprises a protective covering or wrapping applied to the exterior surfaces of the conduit. Any suitable wrapping or covering fulfilling a protective function may be utilized. For example, a spiralled wrapping of wire may be utilized so that the wrapped conduit of the present invention is made to resemble, in appearance, conventional BX cable. It will be appreciated that the present feature may be utilized with any of the foregoing embodiments of the invention or with other embodiments thereof.

In view of the foregoing, it will be understood that I have provided an improved continuous extruded plastic conduit consisting of a plurality of conduit sections joined in abutting and successive relation. In addition, I have provided improved joining means for said conduit sections, comprising internal connectors which permit said conduit sections to be joined to provide a smooth exterior surfaced conduit having as many sections as necessary to suit a given purpose. Since the entire conduit, including the conduit sections and connectors, is formed of a dielectric plastic material characterized by thorough insulating properties, conductors may be inserted within internal compartments extending throughout the length of the conduit and are completely protected and insulated when so inserted. Therefore, non-insulated wire may be used in the present conduits. This wire is not only completely insulated from other wire within the conduit by the partitions forming the aforesaid compartments, but all the conductors are fully and adequately protected against wear, since the interior surfaces of the present conduit are smooth. Also, such conductors are protected from outside contact by the relatively strong, reinforced and sturdy construction of the entire conduit.

I claim:

1. A plastic conduit for receiving electrical conductors, comprising smooth-walled conduit sections provided with internal partitions forming internal compartments or passages, internal connectors securing each of said sections in abutting relation to another section or sections, said connectors having slots for receiving the ends of said partitions and being dimensioned to fit snugly within said compartments or passages, said sections being secured together with the compartment or passages in each section aligned with those of the section or sections adjacent thereto, said sections and connectors consisting of an extruded plastic capable of being softened for extrusion and thereafter hardening to become form sustaining.

2. A plastic conduit for receiving electrical conductors, comprising joined extruded plastic conduit sections consisting of sectors the joined walls of which divide the central space of said sections into conductor receiving compartments, and extruded plastic connectors disposed internally of said sections, said connectors fitting over the walls of the sectors for joining the sectors together to form the sections and at the same time joining successive sections together to form a continuous conduit.

STEPHEN DUNCAN BRADLEY.